United States Patent [19]
Brixy

[11] 3,964,314
[45] June 22, 1976

[54] TEMPERATURE-MEASURING INSTRUMENT

[75] Inventor: Heinz Brixy, Julich, Germany

[73] Assignee: Kernforschungsanlage Julich Gesellschaft mit beschrankter Haftung, Julich, Germany

[22] Filed: Mar. 28, 1972

[21] Appl. No.: 238,834

[30] Foreign Application Priority Data
Mar. 29, 1971  Germany............................ 2115033

[52] U.S. Cl. ........................... 73/359 R; 73/362 AR
[51] Int. Cl.² ........................................ G01K 7/30
[58] Field of Search ...................... 73/359, 362 AR; 338/243, 256, 308, 290

[56] References Cited
UNITED STATES PATENTS

| | | | |
|---|---|---|---|
| 1,267,973 | 5/1918 | Chubb | 338/317 |
| 1,384,467 | 7/1921 | Homan | 338/256 |
| 1,767,715 | 6/1930 | Stoekle | 338/308 |
| 2,571,422 | 10/1951 | Cole | 73/362 AR |
| 2,710,899 | 6/1955 | Marsden et al. | 73/362 AR |
| 2,728,832 | 12/1955 | Hoffman | 73/362 AR |
| 2,768,266 | 10/1956 | Marsden | 73/359 |
| 3,301,707 | 1/1967 | Loeb | 338/308 |
| 3,305,820 | 2/1967 | Lennox | 338/256 |
| 3,441,895 | 4/1969 | Schwartz | 338/308 |

OTHER PUBLICATIONS

Garrison et al.; Review of Scientific Instruments, vol. 20, No. 11, Nov. 1949, pp. 786 and 792.

*Primary Examiner*—S. Clement Swisher
*Assistant Examiner*—Denis E. Corr
*Attorney, Agent, or Firm*—Karl F. Ross; Herbert Dubno

[57] ABSTRACT

A temperature-measuring instrument, operating under the principle of noise-signal generation resulting from temperature which comprises a thin metal strand having a thickness of 5 to 50 $\mu$ in a plurality of turns within an insulating body to increase the effective length of the strand.

4 Claims, 6 Drawing Figures

TEMPERATURE-MEASURING INSTRUMENT

1. CROSS REFERENCE TO RELATED APPLICATION

This application is related to concurrently filed application Ser. No. 238,833.

2. FIELD OF THE INVENTION

The present invention relates to a temperature sensor for a temperature-measuring apparatus or circuit, e.g. as described in the commonly assigned concurrently filed application Ser. No. 238,833 and entitled *System for Measuring Temperatures*, filed by myself and another. More particularly, the invention relates to a temperature-measuring instrument or sensor operating under the principle of electrical noise generation by temperature.

3. BACKGROUND OF THE INVENTION

A number of electrical-output temperature-measuring instruments have been provided heretofore, based on various principles whereby temperature is associated with variations in electrical parameters. For example, thermocouples, consisting of a junction of two different metals, are provided to generate a voltage proportional to temperature and thereby allow measurement of the electrical output to be calibrated directly in temperature terms. In another type of temperature sensor, the fact that a thermal coefficient of electrical resistance exists is used to permit a sensitive element to be connected in a resistance bridge whose output represents the temperature. Other electrical parameters of semi-conductors and conductors have also been used in the detection of temperature changes and in the measurement of temperatures.

The present invention deals with temperature measurement using the noise voltage produced in a conductor. It has been determined by others that noise voltage or thermal noise (also known as Johnson noise) can be produced in a conductor by thermal agitation of electrically-charged particles within the conductor. The available thermal noise power is proportional to the resistance value and is proportional to the absolute temperature and, of course the frequency bandwidth over which the noise is measured. The electrical output is proportional to absolute temperature as indicated.

It is known that all metals have the noise-generation properties mentioned above, i.e. produce a noise voltage which is proportional to temperature. For the most part, platinum has been used heretofore in temperature sensors operated under the noise-voltage principle.

It should be observed that temperature sensors having a measurable noise-voltage output proportional to temperature have the advantage that the output is easily discriminated from changes and is not falsified by any such changes which may not be strictly proportional to temperature. Hence various disadvantages of resistance-temperature sensors can be avoided by the use of noise-voltage sensors. Another problem with conventional sensors has been the generally low output available for a given spatial arrangement of the sensing element.

4. OBJECTS OF THE INVENTION

It is, therefore, the principal object of the present invention to provide an improved noise-voltage temperature sensor which will obviate the aforementioned disadvantages and yield a relatively high level output signal in low cost.

Another object of the invention is the provision of the improved temperature sensor or temperature-measurement device which will generate a relatively large output in an efficient manner while occupying a proportionally small space.

5. SUMMARY OF THE INVENTION

These objects and others which will become apparent hereinafter are obtained in accordance with the present invention which provides a noise-voltage temperature sensor comprising a body of insulating material, preferably an electrically nonconductive ceramic, and a plurality of turns (undulations or loops) of a thin strand of a pure metal or a metal alloy capable of a noise-voltage output in response to variations in temperature, the turns being distributed along the length of the sensor whereby the latter provides a larger output for a given sensor size. The metal strand according to the present invention has a cross section corresponding to a circular area with a diameter between 5 $\mu$ and 50 $\mu$ and preferably has a thickness within this range. Suitable metals include pure metals such as tungstun, tantalum, molybdenum, niobium, titanium, zirconium, platinum; alloys of chromium, nickel and iron, preferably with the aforementioned metals, are also effective.

According to a particular feature of the invention, the strand is, over the length of the elongated sensor provided with a number of turns in a spiral coil or meander configuration. It has been found that such systems are able to provide a high output in a small space without any difficulties with respect to elongation of the sensing element with a temperature rise which has been characterized in earlier arrangement.

According to still another feature of the invention the major portion of the length of the strand is received within the outlines of the insulating body which is composed of a ceramic. Advantageously the body consists of alumina, ($Al_2O_3$), beryllia (BeO), thoria ($ThO_2$), magnesia (MgO) or mixtures thereof sintered or fired into a rigid state. High temperature glasses may also be used.

According to one feature of the invention the ceramic insulating body is formed with a plurality of passages, each of which receives a respective stretch of the metal strand. In another configuration, the metal strand is embedded in a sintered ceramic body, e.g. of alumina, while the preferred case provides the metal strand as a wire, advantage also found it possible to make use of a thin metal film on a carrier of electrically insulating material. In all of the cases described, the temperature sensor is found to have a long useful life and to be easily handled.

6. DESCRIPTION OF THE DRAWING

The above and other objects, features and advantages of the present invention will become more apparent from the following description, reference being made to the accompanying drawing in which.

7. SPECIFIC DESCRIPTION

Figure 1:
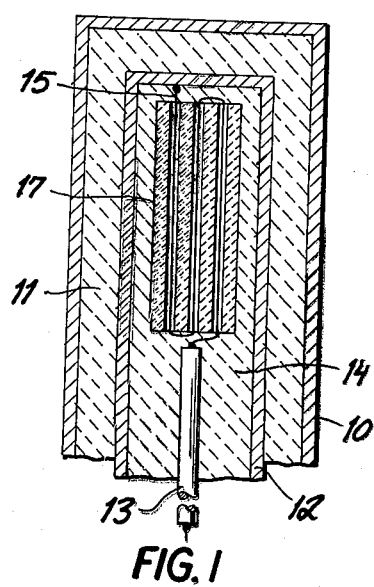
FIG. 1 is an axial cross-sectional view partly in diagrammatic form, of a temperature sensor according to the present invention.

In FIG. 1, I have shown a sensor or temperature measuring instrument adapted to be used in an instrument of the type described and claimed in the aforementioned copending application. The instrument comprises an outer shield 10 of an electrical shielding metal, e.g. steel, which may be grounded to eliminate outside influences upon the signal. Within the outer casing 10 there is provided a body 11 of an electrically insulating ceramic e.g. composed of one or more of the materials described in this connection, which completely envelops a sealed cylinder 12 composed of a metal, e.g. copper, serving as one of the conductors leading to the sensing wire. The other conductor 13 is a rod 13 e.g. of copper, extending coaxially through the cylinder 12 and positioned therein by a body 14 of the electrically insulating ceramic.

Figure 2:
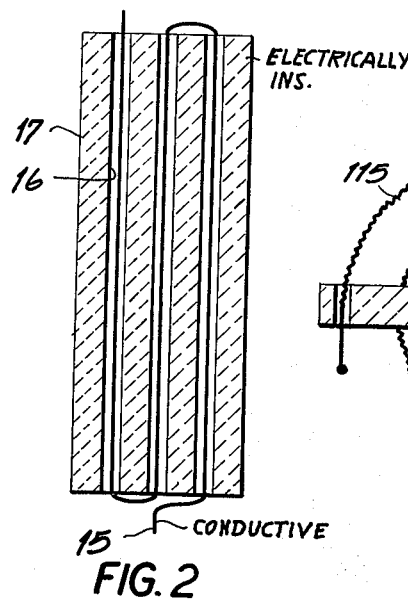
FIG. 2 is an axial cross-sectional view through the ceramic body of FIG. 1.

At its upper end the rod 13 is soldered or welded to one end of a metal strand 15 whose other end is welded or soldered to the end wall of the cylinder 12. The strand 15, composed of one of the sensor metals described above and having a thickness of 5 – 50 $\mu$ while being of circular section, is wound in a number of turns through individual passages 16 of a short length of ceramic tube 17 (see FIG. 2); the passages 16 extend axially and parallel to one another and are formed in the ceramic body or tubule 17. The major portion of the length of the wire 15 lies within the body 17. The latter is sintered or fired from one or more of the ceramic substances already described. The ceramic material mass 14, filling the tube 12, preferably also encapsulates the body 17 and the conductor 15 and fills the passages 16.

Figure 3B:
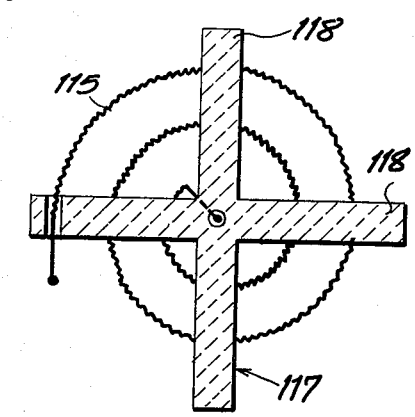
FIG. 3B is a cross-sectional view taken along the line IIIB — IIIB of FIG. 3A.
Figure 3A:
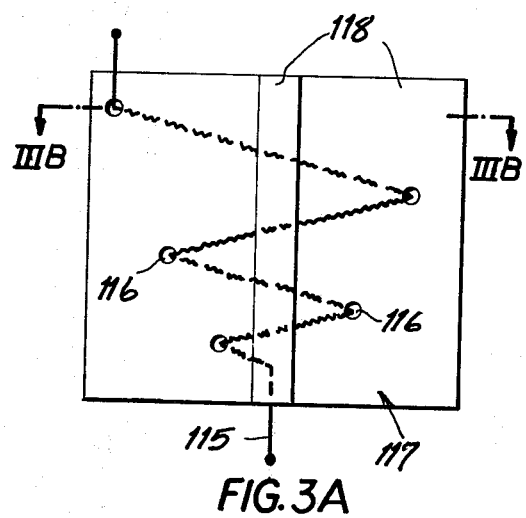
FIG. 3A is an elevational view of the sensing element for a temperature-measuring instrument otherwise having the configuration shown in FIG. 1, according to another embodiment of the invention.

In FIGS. 3A and 3B there has been illustrated an arrangement which, while similar to that of FIG. 1, replaces the body 17 thereof by a ceramic structure 117 whose radial arms 118 are provided with bores 116 allowing the wire 115 to be threaded through in a generally spiral coil.

Figure 5:
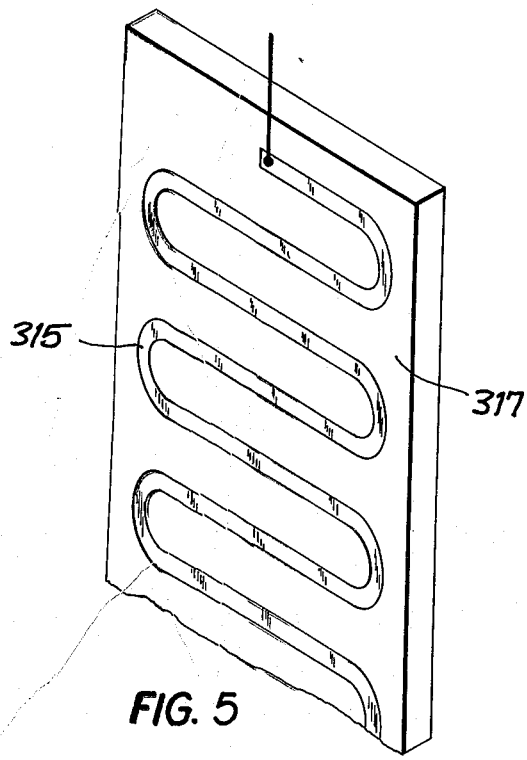
FIG. 5 is a perspective view illustrating a portion of yet another sensing element.
Figure 4:
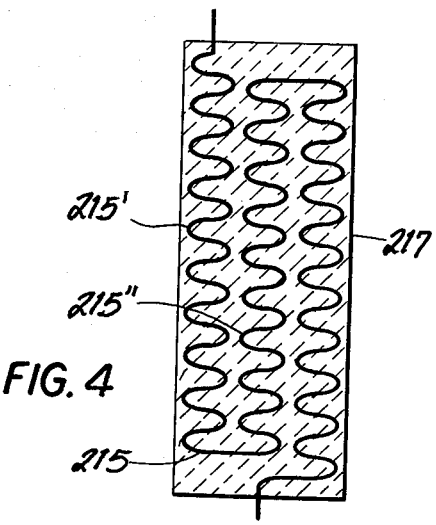
FIG. 4 is an axial cross-sectional view through the sensing element according to another embodiment of the invention.

In FIG. 4, I have shown an arrangement whereby the wire 215 is of undulating configuration and a plurality of undulation 215' and 215'', the system being embedded in a body 217 of sintered alumina oxide. The sensing element of FIG. 5 comprises a metal film (strand) 315 coated on to the insulating carrier 317. Again an undulating configuration is provided.

I claim:

1. In a noise-signal temperature-sensing device, the improvement which comprises a temperature sensor including an elongated housing, a thermal-noise-generating strand composed of a metal and wound in a plurality of turns along the length of the housing and received therein, said strand being composed of a metal selected from the group which consists of tungsten, tantalum, molybdenum, niobium, titanium, zirconium, platinum, chromium, nickel and iron, and chromium-nickel-iron alloys, said strand having a cross-section corresponding to a circle with a diameter between 5 and 50 $\mu$, a body of electrically insulating material separating said turns from each other and composed of at least one ceramic selected from the group which consists of alumina, beryllia, thoria and magnesia, and conductors extending into said housing and connected to said strand at spaced apart locations thereof, said strand being a metal film deposited upon an insulating support.

2. In a noise-signal temperature-sensing device, the improvement which comprises a temperature sensor including an elongated housing, a thermal-noise-generating strand composed of a metal and wound in a plurality of turns along the length of the housing and received therein, said strand being composed of a metal selected from the group which consists of tungsten, tantalum, molybdenum, niobium, titanium, zirconium, platinum, chromium, nickel and iron, and chromium-nickel-iron alloys, said strand having a cross-section corresponding to a circle with a diameter between 5 and 50 $\mu$, a body of electrically insulating material separating said turns from each other and composed of at least one ceramic selected from the group which consists of alumina, beryllia, thoria and magnesia, and conductors extending into said housing and connected to said strand at spaced apart locations thereof, said housing being a metal shield, said body being disposed coaxially within said shield, said sensor further comprising a ceramic mass lining the interior of said housing, a cylindrically conductive tube received in said mass coaxial with said housing and forming one of said conductors, said strand being electrically connected at one end to said tube, a further mass of electrically insulating ceramic material filling the interior of said tube and encapsulating said body and said strand, and a rod extending coaxially through the mass in said tube and electrically connected to the other end of said strand.

3. In a noise-signal temperature-sensing device, the improvement which comprises a temperature sensor including an elongated housing, a thermal-noise-generating strand composed of a metal and wound in a plurality of turns along the length of the housing and received therein, said strand being composed of a metal selected from the group which consists of tungsten, tantalum, molybdenum, niobium, tatanium, zirconium, platinum, chromium, nickel and iron and chromium-nickel-iron alloys, said strand having a cross-section corresponding to a circle with a diameter between 5 and 50 $\mu$, a body of electrically insulating material separating said turns from each other and composed of at least one ceramic selected from the group which consists of alumina, beryllia, thoria and magnesia, and conductors extending into said housing and connected to said strand at spaced apart locations thereof, said strand being a wire embedded in a sintered body of at least one of said ceramics.

4. In a noise-signal temperature-sensing device, the improvement which comprises a temperature sensor including an elongated housing, a thermal-noise-generating strand composed of a metal and wound in a plurality of turns along the length of the housing and received therein, said strand being composed of a metal selected from the group which consists of tungsten, tantalum, molybdenum, niobium, titanium, zirconium, platinum, chromium, nickel and iron, and chromium-nickel-iron alloys, said strand having a cross-section corresponding to a circle with a diameter between 5 and 50 $\mu$, a body of electrically insulating material separating said turns from each other and composed of at least one ceramic selected from the group which consists of alumina, beryllia, thoria and magnesia, and conductors extending into said housing and connected to said strand at spaced apart locations thereof, said body being provided with a multiplicity of passages extending longitudinal in said housing, said strand passing through said passages in alternately opposite directions.

* * * * *